May 29, 1973   A. HAMELIN ET AL   3,736,106
PROCESS FOR FLUX CRYSTALLIZING FERRITES, SPINELS
AND GARNETS FROM 1% MELT MIXTURE
Filed April 3, 1969

United States Patent Office 3,736,106
Patented May 29, 1973

3,736,106
PROCESS FOR FLUX CRYSTALLIZING FERRITES, SPINELS AND GARNETS FROM 1% MELT MIXTURE
André Hamelin, Bellevue, Max Paulus, Paris, and Charles Guillaud, Bellevue, France, assignors to Agence Nationale de Valorisation de la Recherche (Anvar)
Filed Apr. 3, 1969, Ser. No. 813,017
Claims priority, application France, Apr. 4, 1968, 147,034
Int. Cl. B01j 17/02
U.S. Cl. 23—300                           9 Claims

ABSTRACT OF THE DISCLOSURE

To an initial material (mixture of 50% mol. $Fe_2O_3$ and 50% mol. MnO) a flux (for example $BaCO_3$) is added in sufficiently small proportion (85 p.p.m.) so that the liquid phase which appears, when the sample thus constituted is maintained at appropriate temperatures, is constituted by fine liquid films whose presence causes a discontinuous growth of the crystals (diameter of the crystals equal to $10^3$–$10^4\mu$) and the formation of monocrystals, the sample remaining in the solid state.

---

This invention relates to processes for manufacturing monocrystals from the polycrystalline aggregate of an initial material.

The invention is more particularly, but not exclusively, concerned with processes for the treatment of materials constituted of solid solutions of oxides, such as ferrites, spinels and garnets. These monocrystals are used especially in modern techniques of telecommunications, such as, for example, filters, limiters and delay lines.

The chief object of this invention is to provide a process in which the polycrystalline aggregate remains, from a macroscopic point of view, in the solid state during all the phases of the treatment.

The invention takes advantage of the phenomenon according to which, in a sample formed by the addition of a flux, in small quantity, to an initial material, the presence of the flux favours the formation of limited liquid phases in the sample when it is brought to appropriate temperatures lower than its temperature of fusion.

For this purpose, in accordance with this invention, there is added to the initial material a flux in a controlled proportion sufficiently small so that the liquid phase that it causes, when the sample thus constituted is brought to and maintained at temperatures at least equal to the temperatures which lead to the formation of the polycrystalline aggregate and lower than the temperature of fusion of the sample, is constituted by fine liquid films disposed at the joints of only some of the crystals of the aggregate, the presence of these fine liquid films then causing a discontinuous growth of the crystals, which permits monocrystals to be obtained without the aggregate losing, on the macroscopic scale, its solid state.

The presence of these fine liquid films is revealed, at the beginning of the discontinuous growth, by the fact that the joints between large and small crystals have the geometric appearance of an orderly succession of straight lines.

The invention will, in any case, be able to be well understood with the aid of the following complementary description, as well as the accompanying drawings, which complementary description and drawings are, of course, merely given by way of example.

Figure 2:
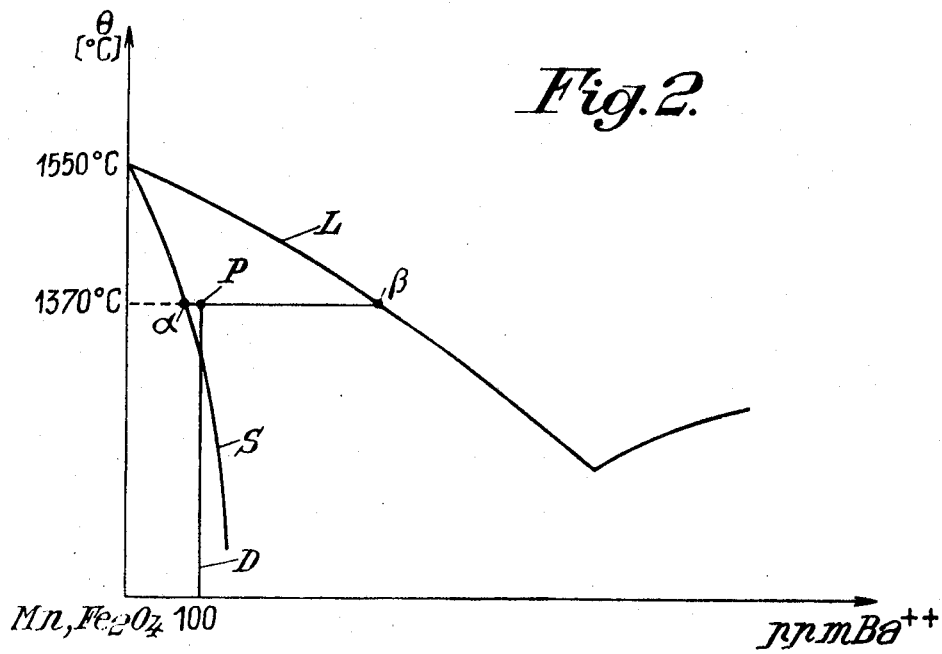
Figure 1:
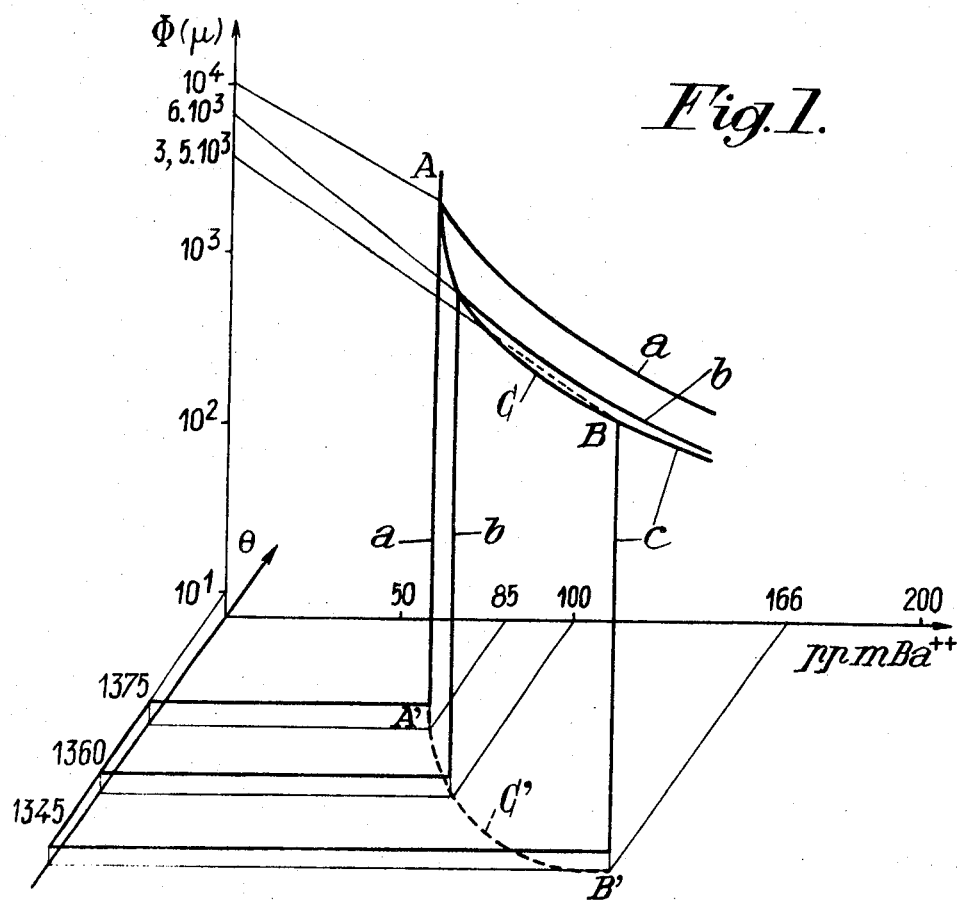

FIG. 1 of these drawings is a perspective view of a 3-dimensional diagram permitting the conditions for carrying out the process to be obtained in the case of a ferrite of manganese, the added flux being BaO; and FIG. 2 shows a part of the equilibrium diagram of a sample constituted by the mixture of the ferrite of manganese and the flux BaO, the temperatures and the BaO contents being limited to small domains.

In order to obtain monocrystals of ferrite for example, and more particularly of cubic ferrite, one proceeds as follows or in an analogous manner.

Before describing the process itself, it will first of all be explained how the conditions for putting the process into practice are determined, by considering, by way of example, the case of a ferrite of manganese.

First, several samples are prepared, each constituted by a mixture, finely ground and compressed, of an initial material made of 50% mol. $Fe_2O_3$ and 50% mol. MnO with a flux in different proportions according to the samples; this flux can advantageously be BaO. The ratios $$\frac{Ba}{Mn+Fe+Ba}$$

are, for example, 10, 50, 85, 100 and 166 parts per million (p.p.m.), Ba, Mn and Fe being expressed in gram-ions.

A thermal treatment is then effected during which the samples are brought to different temperatures comprised between 1345° C. and 1385° C., in an atmosphere in equilibrium with the desired degree of oxidation of the material and comprising, by volume, for example 5% of $O_2$ and 95% of $N_2$, and these various samples are maintained at the different temperatures chosen for 48 hours. The three dimensional diagram of FIG. 1 illustrates the results obtained.

In this diagram, the mean diameter, in microns, of the monocrystals of ferrite of manganese which are formed in the samples is read along a logarithmic scale indicated on the vertical axis $\phi$ as a function of the temperatures, in ° C., and of the concentrations, in p.p.m., of cations $Ba^{++}$ in the samples, which temperatures and concentrations are respectively indicated on the horizontal axes $\theta$ and $Ba^{++}$.

It can be seen on this diagram that, when the temperature and the concentration of cations $Ba^{++}$ in a sample are such that the point that they define in the horizontal plane of the axes $\theta$ and $Ba^{++}$ crosses the curve C' (shown in a broken line) whose ends are respectively denoted A' and B', a discontinuity appears in the value of the mean diameter of the monocrystals which are formed.

For the same duration of thermal treatment at constant temperature, according as the point in question is located on one side or on the other side of this curve C' and near to this curve C', the monocrystals obtained have a mean diameter of about $10\mu$ or of about from $10^3$ to $10^4\mu$.

Thus by taking for example some samples having different concentrations of cations $Ba^{++}$, and by bringing these samples to a temperature of 1375° C. which is maintained for 48 hours, the monocrystals obtained at the end of the treatment have, as shown by the curve $a$ representing their mean diameter, a mean diameter of $10\mu$ for the samples having concentrations of cations $Ba^{++}$ lower than 85 p.p.m. and a mean diameter of $10^4\mu$ for the sample with a concentration of cations $Ba^{++}$ of 85 p.p.m. (point A of the diagram).

Similarly, with samples maintained for 48 hours at a temperature of 1360° C., the curve $b$ indicates that the sample in which the concentration of cations $Ba^{++}$ is equal to 100 p.p.m. furnishes, after treatment, monocrystals of a mean diameter of $6 \times 10^3\mu$.

Similarly again, with samples maintained for 48 hours at a temperature of 1345° C., the curve $c$ indicates that, for concentrations of cations $Ba^{++}$ lower than 166 p.p.m., the monocrystals obtained after treatment have a mean diameter of 10μ and that, for a concentration of cations Ba$^{++}$ of 166 p.p.m., the sample furnishes, after treatment, monocrystals of a mean diameter of 3.5×10$^3$μ (point B of the diagram).

Beyond the curve C, which passes through A and B, the curves $a$, $b$ and $c$ indicate that the values of the diameters of the monocrystals obtained decrease for increasing concentrations of cations Ba$^{++}$ and are lower than the maximum values of the diameters given by the curve C.

In order to carry out the process according to the invention, it is first apropriate to determine the nature of the flux to be added to the initial material.

It is necessary that the cations comprised by the flux (Ba$^{++}$ in BaO) have an ion radius very different from the radius of the lacunas (holes) or "sites" existing inside the crystals of the polycrystalline aggregate in order that these cations form a liquid film outside a few crystals.

The ionic radius of the cations of the flux can be greater or smaller than the radius of the lacunas in the polycrystalline aggregate, the difference being advantageously at least equal to 0.25 A.

According to the nature of the ferrite or of the garnet to which the process of this invention is applied, a flux will be chosen such as PbO, B$_2$O$_3$, BaO, etc.

It should be noted that only the nature of the cations of the flux is to be taken into consideration, the compound in the form of which this flux is presented being without consequence on the application of the process. The flux aded to the initial material can be introduced in the form of an oxide, a carbonate, a nitrate or any other salt (for example: BaCO$_3$).

By way of example, BaO is quite suitable when the process of the invention is aplied to ferrite of manganese. Its characteristics are in particular:

diameter of the cations Ba$^{++}$: 1.43 A.

and the characteristics of the ferrite of manganese:

diameter of the sites: 0.67 A. and 0.72 A.

Once the choice of the flux has been made and the temperature of formation of the monocrystals is known, it is then appropriate to determine the concentration of cations of the flux in the sample. FIGS. 1 and 2, which relate to a ferrite of manganese to which BaO has been added as flux, gives an approximate value of the concentration, but it is obvious that a person skilled in this art will be able to determine the concentrations corresponding to another ferrite and to another flux, in particular by establishing a diagram such as the one shown in FIG. 1.

An approximate determination of the concentration of the flux in the sample taken here as an example, is furnished by FIG. 2 in which are shown the solidus curve (denoted S) and the liquids curve (denoted L) of an equilibrium diagram of this sample. The temperatures Θ are indicated on the ordinate (in °C.) and the concentrations of the flux BaO are indicated on the abscissa (in p.p.m.), in percentage of gram-ions of Ba$^{++}$ with respect to the sum of all the cations of the sample. When the thermal treatment described above is carried out, the point representative of the proportion of the flux in the sample and of the temperature describes a straight line D, and the formation of monocrystals takes place from the moment when this straight line D cuts the solidus line, for example at the point P comprised between the liquidus line and the solidus line, this point P being preferably situated in the neighbourhood of the solidus line. If α and β designate respectively the intersections with the curves S and L of a straight line passing through P and parallel to the abscissa axis, the ratio of the lengths Pα over Pβ (=liquid/solid) should be smaller than 0.01 in order to obtain large monocrystals.

FIG. 1 gives precise indications as to the proportion of flux to be added to the initial material in the case of a ferrite of manganese. This figure permits the determination, in particular experimentally, for each temperature of formation of the monocrystals, of the optimum proportion of flux in the sample in order to obtain, at the end of the thermal treatment, monocrystals of maximum diameter. For example, for a temperature of 1360° C., it is necessary to add to the ferrite of manganese, 100 p.p.m. of Ba$^{++}$ in order to obtain monocrystals of a diameter of 6×10$^3$μ.

In the application of the process, the conditions in respect of the preparation of the sample, the oxygen content of the surrounding atmosphere and the heating of the sample, are the same as the conditions usually imposed for the formation of the polycrystalline aggregate of the initial material. The bodies used in the process should be very pure, taking into account the small proportions of flux added to the initial material. Considering as an impurity any element whose presence in the sample does not lead to the formation of ferrites or garnets of the same crystalline structure, the molar concentration of these impurities in a sample should be lower than the molar concentration of the flux in this same sample.

The sample which is to be treated by the process can be prepared, as has been explained above, by making a mixture, finely ground and compressed, of an initial material—such as the material from which a ferrite can be obtained—and a flux; or a ferrite can be prepared by sintering this initial material, grinding the ferrite and mixing it with a flux, the mixture being then compressed.

Before the application of the process, these samples can be brought to a temperature advantageously chosen lower than the treatment temperature, in order to obtain a polycrystalline aggregate of low porosity.

According to a particular application of the invention, it is possible to obtain monocrystals of elongated form by displacing the sample in a furnace having a thermal gradient. In this case, the speed of advance of the sample with respect to the zone where the thermal gradient is localized should be adapted to the speed of growth of the monocrystal. Needless to say, in this process the sample remains constantly in the solid state from a macroscopic point of view.

By way of indication, the various conditions of the process of manufacturing a monocrystal will be given hereafter, for a ferrite of manganese, prepared from the initial primary material which it was a question of above, that is to say a mixture of 50% mol. of Fe$_2$O$_3$ and 50% mol. of MnO. To this initial material has been added 85 p.p.m. of cation of BaCO$_3$ as flux.

After compression of the mixture at three metric tons per cm.$^2$, the sample is maintained for 48 hours at a temperature of 1375° C. in a nitrogen atmosphere containing 5% of O$_2$. The monocrystals obtained have a diameter of 10 millimeters. The barium content of these crystals is lower than 30 p.p.m.

Also by way of indication, various mixtures were prepared of 61.5% mol. Fe$_2$O$_3$, 38.5−$x$% mol. NiO and $x$% mol. CoO, with $x$ comprised between 0 and 1.5. 95 p.p.m. of BaCO$_3$ was added, and monocrystals were obtained after maintaining the compressed powder at 1400° C. for 48 hours.

Another mode of preparation of the sample was applied by making a mixture of 50% Fe$_2$O$_3$ and 50% MnO, compressing this mixture at 500 kg./cm.$^2$ and maintaining its temperature of 1050° C. for 24 hours. The ferrite of manganese thus obtained was ground and mixed with 100 p.p.m. of BaCO$_3$ then compressed at 3 metric tons/cm.$^2$ into a compact and heated at 1375° C. for 85 hours in order to obtain monocrystals.

For garnets, monocrystals were also obtained by adding 350 p.p.m. of flux to the initial material.

After the application of the process, the sample is allowed to cool, for example for 24 hours, and the monocrystals are cut by appropriate mechanical processes.

The process according to this invention has numerous advantages, among which the following can be cited:

due to the fact that the sample remains, from a macroscopic point of view, in the solid state during the entire treatment by the process, the growth of monocrystals can take place without a crucible and with the same furnaces and the same equilibrium conditions as for the sintering of the polycrystalline material;

the monocrystals are obtained rapidly and have large dimensions.

The invention should not be limited to the particular examples described above, for many modifications and changes can be effected without departing from the spirit or scope of this invention.

What we claim is:

1. A process for the preparation of monocrystals from a polycrystalline aggregate of an initial material selected from the group consisting of ferrites, spinels and garnets comprising (a) mixing said polycrystalline aggregate with an amount of flux, (b) heating the mixture to a temperature lower than the melting point of the initial material, but higher than the melting point of a eutectic mixture of the initial material and flux, wherein (1) the flux is selected among those whose cations have a radius which differs from that of the holes of the crystal lattice of said initial material by at least ±0.25 A. and (2) the amount of flux ranges from the minimum value required to cause first appearance of a liquid at the joints of some of the crystals at said temperature and a maximum value which results in the melting of 1% by weight of the mixture at said temperature, and (c) maintaining the mixture at said temperature for a time sufficient to cause growth of monocrystals, wherein the weight ratio of the liquid to the solid in the mixture is maintained substantially constant during the entire monocrystal growing process.

2. Process according to claim 1, wherein the flux that is added to the initial material is in the form of an oxide or a salt.

3. Process according to claim 2, wherein said salt is a carbonate or a nitrate.

4. A process according to claim 1 wherein the initial material is a ferrite and the flux contains cations selected from the group consisting of $Ba^{++}$, $B^{+3}$ and $Pb^{++}$.

5. A process according to claim 4 wherein the ferrite is a manganese ferrite and the flux contains $Ba^{++}$ cations.

6. A process according to claim 4 wherein the ferrite is a nickel cobalt ferrite and the flux contains $Ba^{++}$ cations.

7. A process according to claim 1 wherein the oxygen partial pressure of the atmosphere is maintained in the vicinity of the value corresponding to the oxygen partial pressure of the initial material at said temperature.

8. A process according to claim 1 wherein the mixing of said polycrystalline aggregate with said flux comprises sintering the polycrystalline aggregate, grinding the sintered material, mixing the ground material with the flux and compressing the mixture to form a sample.

9. A process according to claim 8 wherein the sample is heated by being moved through a zone maintained at said temperature, the speed of movement of the sample being sufficiently low to allow for the growth of monocrystals in the portion of said sample within said zone.

References Cited

UNITED STATES PATENTS

| | | | |
|---|---|---|---|
| 2,460,334 | 2/1949 | Buerger et al. | 23—51 |
| 2,930,098 | 3/1960 | Emeis | 23—301 |
| 2,990,261 | 6/1961 | Greiner | 23—301 |
| 3,057,677 | 10/1962 | Ballman | 23—295 |
| 3,278,273 | 10/1966 | Fischer et al. | 23—301 |
| 3,409,412 | 11/1968 | Sasaki | 23—300 |
| 3,414,372 | 12/1968 | Paulus et al. | 23—301 |
| 3,428,416 | 2/1969 | Gie et al. | 23—51 |
| 3,429,818 | 2/1969 | Benedetto et al. | 23—301 |
| 3,464,785 | 9/1969 | Galasso | 23—51 |
| 3,003,966 | 10/1961 | Van Uitert | 252—62.57 |
| 3,079,240 | 2/1963 | Remeika | 106—42 |
| 3,091,540 | 5/1963 | Nielsen | 252—62.57 |

NORMAN YUDKOFF, Primary Examiner

R. T. FOSTER, Assistant Examiner

U.S. Cl. X.R.

252—62.57; 23—51, DIG. 1